3,156,667
HEAT STABILIZATION OF POLYVINYL ALCOHOL WITH PHOSPHORIC ACID
Joseph G. Martins, Ludlow, Mass., assignor to Shawinigan Resins Corporation, Springfield, Mass., a corporation of Massachusetts
No Drawing. Filed Mar. 5, 1962, Ser. No. 177,199
3 Claims. (Cl. 260—45.7)

This invention relates to the preparation of heat stable polyvinyl alcohol. More particularly it relates to the heat stabilization of polyvinyl alcohol by the incorporation of phosphoric acid in the resin.

Polyvinyl alcohol, it is well known, is usually prepared by the alkaline hydrolysis of a suitable polyvinyl ester rather than by the direct polymerization of the vinyl alcohol monomer, a compound too unstable for independent existence. Alkaline hydrolysis, although more efficient in many ways than acid hydrolysis, is unfortunately attended by the formation of color, a phenomenon which renders the resulting resin more or less inacceptable for many potential applications. Several methods have been proposed to restore this useful resin to its contemplated applications and these methods have been by and large successful. However, a problem remains. If a colorless polyvinyl alcohol be subjected to moderate heat for a certain period, say for instance 150° C. for 30 minutes, it will without further treatment develop a significant amount of color. This color may range from deep yellow to dark brown. It arises in an unknown manner in the course of the decomposition of the resin, a process which probably involves oxidation, chain splitting, cross-linking, dehydration and so on. While the appearance of color is in itself a phenomenon to be avoided, it is also accompanied as may well be imagined by other serious changes in the resin's properties such as, to name a few, decrease in flexibility, loss of ability to elongate, embrittlement and alteration of solubility characteristics.

It is therefore an object of this invention to prepare a polyvinyl alcohol with great inherent resistance to color producing thermal degradation.

This has been achieved by the neutralization of vinyl ester polymer hydroylzates with phosphoric acid. The improvement derived from this treatment may be demonstrated by heating the resin at an elevated temperature, e.g., 150° C. for 45 minutes, and observing the formation of color. The effect of neutralization with phosphoric acid as opposed to that of neutralization with a commonly employed acid such as acetic acid, or for that matter, of no neutralization at all, will be vivid.

How this critical neutralization step is accomplished will be described presently. With respect to the particular resins used in the following examples, it should be noted that they have been selected only to illustrate the larger class of polyvinyl alcohols that may be benefited by this invention. That class will be defined later.

*Example 1*

A methanol solution of polyvinyl acetate resin weighing 453 g. and containing 45% by weight of a polyvinyl acetate having a viscosity of 10 centipoises in benzene at 20° C. (86 g./l.), was intimately mixed at 47° C. with 13 ml. of a 3.9% sodium hydroxide solution in methanol. The mixture was vigorously agitated for two minutes. It was noted that a gel structure appeared after 9.5 minutes. The gel was chopped finely and, at the end of 28 minutes, was steeped in 400 ml. methanol containing 0.45 ml. 85% phosphoric acid. After a few minutes stirring, the resin was drained of liquors, washed five times with 300 ml. portions of methanol and dried in an air oven at 70° C.

After heating the resinous product to 145° C. for 45 minutes, it was found to be still water soluble as well as negligibly colored. An aliquot of the alkaline hydrolyzate not subjected to the neutralization operation exhibited severe degradation as gaged by color formation and became partially insoluble upon similar heat treatment.

The polyvinyl alcohol produced in this manner had a viscosity of 9 centipoises as a 4% solution in water at 20° C. and a polyvinyl acetate weight content of 34.6% as measured by saponification.

*Example 2*

Another hydrolysis was carried out as in Example 1. The neutralization however was not performed until one hour, rather than 30 minutes, had elapsed after the initial contact between the resin and the sodium hydroxide solutions.

The polyvinyl alcohol product after exposure to heat in the prescribed manner was again negligibly colored but was found to contain, upon saponification, only 17.3% by weight of polyvinyl acetate. Its viscosity in water was 10 centipoises for a 4% solution at 20° C.

*Example 3*

The hydrolysis of Example 1 was repeated once more. The neutralization of the hydrolyzate, on the other hand, was carried out by steeping the comminuted gel in 400 ml. methyl alcohol containing 0.90 ml. 85% phosphoric acid, i.e., two equivalents of the hydrolyzing base used.

The heat stability of the product thus treated was found to be equal to that of polyvinyl alcohol treated according to the procedure of Example 1.

*Example 4*

To 100 ml. of a 40% solution of 19:1 vinyl acetate-vinyl chloride copolymer in methanol was added 4.5 ml. of a 3.9% sodium hydroxide solution in methanol. The mixture was vigorously agitated for 2 minutes at 50° C. After 38 more minutes, the resulting gel was comminuted and steeped in 150 ml. methanol containing 0.16 ml. 85% phosphoric acid. After a few minutes stirring, the resin was drained and washed with five consecutive 100 ml. portions of methanol. The solids were dried in an air oven at 70° C.

Heating the resin at 145° C. for 45 minutes only resulted in the formation of a very slight amount of yellow color and did not affect the solubility of the resin. The polyvinyl alcohol thus prepared was found to contain 20 weight percent of residual polyvinyl acetate, the balance being polyvinyl alcohol and polyvinyl chloride.

*Examples 5–8*

These examples illustrate the advantages gained by the neutralization, with phosphoric acid, of the alkaline polyvinyl acetate hydrolyzates obtained in the course of the continuous process disclosed by Germain in U.S. Patent 2,643,994.

As in Examples 1–17 of that patent, the polyvinyl acetate was dissolved in methanol or in methyl acetate-methanol mixture. This resin solution and the sodium hydroxide solution were fed into a mixing device at set rates and were thoroughly blended as taught. The mixture was discharged on a conveyor belt and, after syneresis, the rubbery solid product was chopped finely.

Departure from the Germain continuous hydrolysis procedure took place at this point in that phosphoric acid was used for the step 6 neutralization instead of acetic acid. The pertinent changes as carried out in Examples 5 and 7 are presented in the following table along with the comparable data for Examples 6 and 8 which were acetic acid neutralized control runs.

| Ex. | Temp. (° C.) | Feed Rates | | Reaction Time (min.) | 10% H₃PO₄ Feed Rate (ml./min.) | Residual vinyl acetate (percent by wt.) |
|---|---|---|---|---|---|---|
| | | Resin (gal./min.) | 4% NaOH (ml./min.) | | | |
| 5 | 45 | 0.35 | 32.2 | 30 | 11 | 34.8 |
| 6 | 45 | 0.35 | 32.2 | 30 | (CH₃COOH) | 34.5 |
| 7 | 46 | 0.35 | 45.0 | 34 | 15.5 | 0 |
| 8 | 45 | 0.35 | 45.0 | 33 | (CH₃COOH) | |

The resin solution used in these examples was in all cases a 45% by weight methanol solution of a polyvinyl acetate having a viscosity of 15 centipoises in benzene at 20° C. at the concentration of 86 g./l.

In Examples 5 and 7, the comminuted hydrolyzate was slurried in methanol and washed with a counter current feed of 10% by weight phosphoric acid in methanol at the rate indicated above, the acid solution being further diluted with methanol prior to contact with the hydrolyzate. After neutralization, the resin was drained, washed five times with methanol and dried in tray driers at 70° C. after 6 hours.

In Examples 6 and 8, the comminuted resin was dumped in a methanol bath kept slightly acidified with acetic acid. After steeping, the polyvinyl alcohol was drained and dried in trays for 6 hours at 70° C.

On heating these four products to 150° C. for 45 minutes, it was found that the phosphoric acid neutralized polyvinyl alcohol resins remained practically colorless while the resins of Examples 6 and 8 assumed a dark amber color.

The polymers which can benefit from this invention belong to the general class of partially to completely hydrolyzed polyvinyl ester homopolymers as well as partially to completely hydrolyzed polyvinyl ester copolymers made up of either different vinyl ester monomers or of a vinyl ester monomer and another compatible vinyl monomer which is not a vinyl ester. This will be illustrated presently. These polyvinyl alcohols or hydrolyzed polyvinyl esters should have at least 20% of their ester groups hydrolyzed off and possess a molecular weight average within the range of 1,200 to 125,000.

For example, useful polyvinyl alcohols are those obtained by the hydrolysis of 20–100% of the ester groups of homopolymers such as vinyl acetate, vinyl propionate, vinyl butyrate, vinyl hexoate, vinyl benzoate and others. As typical of the useful terpolymer type of vinyl alcohol which is obtained by the partial hydrolysis of vinyl ester copolymers, there are included copolymers of a vinyl ester with other vinyl esters such as vinyl acetate, vinyl propionate, vinyl butyrate, vinyl hexoate, vinyl stearate, and the like; copolymers of a vinyl ester with a vinyl halide such as vinyl chloride and vinyl bromide; copolymers of a vinyl ester with the lower alkyl esters of acrylic acid such as methyl acrylate, ethyl acrylate, propyl acrylate, butyl acrylate, hexyl acrylate, ethylhexyl acrylate, octyl acrylate and the like; copolymers of a vinyl ester with the lower alkyl esters of methacrylic acid such as methyl, propyl, butyl, hexyl, octyl methacrylates and the like; copolymers of a vinyl ester with monoethylenically unsaturated carboxylic acids such as acrylic, methacrylic, crotonic acids and the like; copolymers of a vinyl ester with other ethylenic monomers such as ethylene, propylene, isobutylene and others. All these useful vinyl alcohol polymers are well known and methods for their preparation are readily available.

The process of this invention is especially applicable to water soluble polyvinyl alcohols formed by the direct hydrolysis of the vinyl ester polymers and copolymers just enumerated. These preferred water soluble polyvinyl alcohols may contain from 0 to 45% unhydrolyzed ester groups and may have a viscosity ranging from 3 to 65 centipoises as 4% solutions in water at 20° C. It should be noted, however, that the water solubility of such polymers is in addition to the two factors just mentioned, i.e. degree of hydrolysis and molecular size as indicated by viscosity, affected by the nature of the remaining ester groups. If such groups be benzoates or stearates, for instance, much less than 45% of them must remain in the polyvinyl alcohol molecule if the latter is to be water soluble. An especially preferred class of polyvinyl alcohols is afforded by the completely or partially hydrolyzed polymers of vinyl acetate by reason of the commercial availability of such materials. Methods to prepare such polymers are found in U.S. Patents 2,502,715 and 2,643,994.

The preferred organic liquids for carrying out the phosphoric acid neutralization of polyvinyl alcohol and the washing of the neutralized resin are essentially those liquids in which the hydrolysis may be done, namely methyl acetate, methyl alcohol, ethyl alcohol, ethyl acetate and acetone. Mixtures of these liquids may also be employed.

It should be pointed out with special emphasis that the repeated washing of the polyvinyl alcohol resin with the recommended organic liquids is a critical part of the process of this invention. These liquids do not dissolve either the resin or the phosphates formed during the neutralization. Unwashed resins treated with phosphoric acid were found to be rather unstable upon heating as evidenced by the significant amount of color produced and the corresponding alteration in solubility. Neither did washing of the resins in the absence of neutralization with phosphoric acid impart any heat stability to them.

The amount of phosphoric acid employed in the process is entirely dependent on the amount of sodium hydroxide used as hydrolyzing catalyst. From 1 to 2 equivalents of the acid diluted with a proper solvent must be employed for each equivalent of alkali.

The processing of polyvinyl alcohol by the method disclosed in this invention does not preclude the addition of the variety of useful ingredients which are known to improve the properties of this polymer. Among the types of materials which may be added to the resin along with the alkali metal phosphates are plasticizers, anti-oxidants, fungicides, and so on, depending on the prospective use of the resin. The phosphate treated resin containing the appropriate additives can be employed in conventional manner i.e. can undergo such transformation as molding, extrusion and so on. Advantageously, however, is the fact that a greater working temperature range is now permissible for the use of the resin either during its transformation or in its ultimate applications.

What is claimed is:
1. A process to heat stabilize polyvinyl alcohol resins prepared by hydrolysis of vinyl acetate polymers with an alkaline hydrolysis catalyst,
said polyvinyl alcohol having a molecular weight of 12,000 to 125,000 and 0 to 80% by weight of residual acetate groups calculated as polyvinyl acetate,
said process comprising neutralizing said polyvinyl alcohol by steeping in a solution of phosphoric acid dissolved in an organic liquid selected from the group consisting of methyl acetate, ethyl acetate, methyl alcohol, ethyl alcohol, acetone, and mixtures thereof, removing said acid solution, and wash- ing the polyvinyl alcohol with the organic liquid, the amount of phosphoric acid used is chemically equivalent to 100–200% of the alkaline catalyst.

2. The process of claim 1 wherein the polyvinyl alcohol is a water soluble resin containing 0 to 45% by weight of residual acetate groups calculated as polyvinyl acetate and having a viscosity within the range of 3 to 65 centipoises as a 4% aqueous solution at 20° C.

3. The process of claim 1 wherein the neutralized polyvinyl alcohol is washed at least five times with the organic liquid selected.

References Cited in the file of this patent
UNITED STATES PATENTS

| | | |
|---|---|---|
| 2,566,255 | Smith | Aug. 28, 1951 |
| 2,610,359 | Hatchard | Sept. 16, 1952 |
| 2,642,420 | Kenyon | June 16, 1953 |
| 2,850,489 | Turnbull | Sept. 2, 1958 |